United States Patent
Zhou et al.

(10) Patent No.: US 12,175,338 B2
(45) Date of Patent: Dec. 24, 2024

(54) BYZANTINE-ROBUST FEDERATED LEARNING

(71) Applicant: International Business Machines Corporation, Armonk, NY (US)

(72) Inventors: Yi Zhou, San Jose, CA (US); Nathalie Baracaldo Angel, San Jose, CA (US); Kamala Micaela Noelle Varma, Minneapolis, MN (US); Ali Anwar, San Jose, CA (US); Syed Amer Zawad, Reno, NV (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 17/195,982

(22) Filed: Mar. 9, 2021

(65) Prior Publication Data

US 2022/0292387 A1    Sep. 15, 2022

(51) Int. Cl.
*G06N 20/00*    (2019.01)
*G06F 17/16*    (2006.01)
(Continued)

(52) U.S. Cl.
CPC ............ *G06N 20/00* (2019.01); *G06F 17/16* (2013.01); *G06F 21/566* (2013.01); *G06F 21/577* (2013.01); *G06F 2221/033* (2013.01)

(58) Field of Classification Search
CPC .... G06N 20/00; G06N 3/0442; G06N 3/0464; G06N 3/098; G06F 17/16; G06F 21/566; G06F 21/577; G06F 2221/033
See application file for complete search history.

(56) References Cited

U.S. PATENT DOCUMENTS

| 7,610,387 B1 * | 10/2009 | Liskov | H04L 45/00 |
| | | | 709/227 |
| 10,956,825 B1 * | 3/2021 | Chen | G06N 5/04 |

(Continued)

FOREIGN PATENT DOCUMENTS

| WO | 2019105543 A1 | 6/2019 |
| WO | 20201136 A1 | 1/2020 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Kevin Bechtel
*Assistant Examiner* — Sayeda Salma Nahar
(74) *Attorney, Agent, or Firm* — Yee & Associates, P.C.

(57) ABSTRACT

A federated learning method comprises creating a log of previously provided gradients from a plurality of workers, receiving updated gradients from the plurality of workers, calculating a vulnerability weight for each layer of a global machine learning model using the updated gradients, calculating an aggregated gradient using the vulnerability weight and the updated gradients, and updating the global machine learning model using the aggregated gradient. Some embodiments may also determine whether a Byzantine attack is occurring based upon the calculated aggregated gradient. An apparatus and computer program product may be used to implement the method.

13 Claims, 11 Drawing Sheets

(51) Int. Cl.
    *G06F 21/56*     (2013.01)
    *G06F 21/57*     (2013.01)

(56) References Cited

U.S. PATENT DOCUMENTS

| | | | | |
|---|---|---|---|---|
| 11,081,219 | B1* | 8/2021 | Dods | G06F 17/18 |
| 11,631,035 | B2* | 4/2023 | Schuster | G06N 20/00 |
| | | | | 706/12 |
| 2001/0031083 | A1* | 10/2001 | Weldy | H04N 1/6027 |
| | | | | 382/167 |
| 2019/0042878 | A1* | 2/2019 | Sheller | H04L 67/10 |
| 2020/0394552 | A1* | 12/2020 | Ganapavarapu | H04L 9/50 |
| 2021/0044609 | A1* | 2/2021 | Keshtkarjahromi | |
| | | | | H04L 63/1416 |

OTHER PUBLICATIONS

Abadi et al. Tensorflow: A system for large-scale machine learning, 2016.
Blanchard et al, Byzantine-tolerant machine learning, 2017.
Blanchard et al, Machine learning with adversaries: Byzantine tolerant gradient descent. In Advances in Neural Information Processing Systems, pp. 118-128, 2017.
Bottou, L. E. 1998. Online Learning and Stochastic Approximations.
Charikar et al, Learning from untrusted data, 2016.
Chen et al, "Distributed statistical machine learning in adversarial settings: Byzantine gradient descent," Proceedings of the ACM on Measurement and Analysis of Computing Systems, vol. 1, No. 2, pp. 1-25, 2017.
El-Mhamdi, E., Guerraoui R., and Rouault, S., Distributed Momentum for Byzantine-resilient Learning. arXiv preprint arXiv:2003.00010, 2020.
Fu et al, "Attack-resistant federated learning with residual-based reweighting," arXiv preprint arXiv:1912.11464, 2019.
Fung et al, Mitigating sybils in federated learning poisoning. arXiv preprint arXiv:1808.04866, 2018.
Ghosh, Avishek, et al., "Communication Efficient and Byzantine Tolerant Distributed Learning," 2020 IEEE International Symposium on Information Theory (ISIT), pp. 2545-2550.
Guerraoui, R., Rouault, S., et al. The hidden vulnerability of distributed learning in byzantium. International Conference on Machine Learning, pp. 3518-3527, 2018.
Konecny et al, 2015. Federated Optimization: Distributed Optimization Beyond the Datacenter.
Krishnaswamy et al, Constant approximation for k-median and k-means with outliers via iterative rounding, 2017.
Lamport et al, The byzantine generals problem. ACM Trans. Program. Lang. Syst., 4(3):382-401, Jul. 1982.
Lecun et al, Gradient-based learning applied to document recognition. In Proceedings of the IEEE, pp. 2278-2324, 1998.
Ludwig, et al. IBM federated learning: an enterprise framework white, 2020.
McMahan et al, Communication-efficient learning of deep networks from decentralized data, 2016.
Munoz-Gonzalez et al, Byzantine-robust federated machine learning through adaptive model averaging, 2019.
Pillutla et al, Robust aggregation for federated learning, 2019.
Rajput et al, Detox: A redundancy-based framework for faster and more robust gradient aggregation. CoRR, abs/1907.12205, 2019.
Rieger et al, Client adaptation improves federated learning with simulated non-IID clients, 2020.
S. Minsker and N. Strawn. Distributed statistical estimation and rates of convergence in normal approximation. arXiv preprint arXiv:1704.02658, 2017.
So, Jinhyun, et al., "Byzantine-Resilient Secure Federated Learning," arXiv preprint arXiv:2007.11115, 2020, 17 pages.
Wang et al, Federated learning with matched averaging, 2020.
Xia et al, Faba: An algorithm for fast aggregation against byzantine attacks in distributed neural networks. In Proceedings of the Twenty-Eighth International Joint Conference on Artificial Intelligence, IJCAI-19, pp. 4824-4830. International Joint Conferences.
Xie et al, Fall of empires: Breaking byzantine-tolerant SGD by inner product manipulation, 2019.
Xie et al, Zeno: Distributed stochastic gradient.
Xie et al. Generalized byzantine-tolerant SGD, Mar. 23, 2018.
Yin, D., Chen, Y., Ramchandran, K., and Bartlett, P. Byzantine-robust distributed learning: Towards optimal statistical rates. arXiv preprint arXiv:1803.01498, 2018.
Zhang et al., Are all layers created equal?, 2019.
Zhao et al., Federated learning with non-iid data, 2018.

* cited by examiner

BYZANTINE-ROBUST FEDERATED LEARNING

BACKGROUND

The present disclosure relates to machine learning, and more specifically, to byzantine-robust federated learning.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these new capabilities is machine learning (ML). ML systems generally use models trained to perform a task. Those models may be based on inferences or predictions made from a given input value, and are typically created (i.e., trained) using large data sets. The resulting models may be used to perform a variety of tasks, such as speech recognition, subject recognition in images, generating content recommendations to a user of an application or website, and autonomous control of motor vehicles.

Federated learning (FL) generally refers to a ML paradigm that allows multiple entities, commonly called "workers," to collaboratively train a global ML model based on their respective collection(s) of training data, without the need to actually exchange any of that training data. Each worker in a FL system may train a local ML model using its own training data, and then periodically sends measures of the current information of that local ML model (for example, "local gradients") to a central aggregator. The central aggregator, in turn, may use those gradients to compute an aggregated gradient. The aggregated gradient may then be used to update the global ML model.

The workers in an FL system may benefit by receiving a better quality global ML model, as utilizing more training data in typically equates to better ML models. This advantage could materialize in an IoT setting, where edge devices may use FL to learn from all collected data without sacrificing limited local storage or the privacy of the collected data. FL may also be used by a consortium of companies, such as hospitals that want to collaboratively train an ML model to diagnose a disease or banks that want to collaboratively train a ML model to identify credit card fraud, without violating privacy regulations (e.g., Health Insurance Portability and Accountability Act or General Data Protection Regulation). Additionally, FL may be used by competitors that want to enjoy the benefits of better ML models without exposing their own sensitive business or trade secret data.

If one or more workers within a FL system uses inaccurate data or encounters communication errors, however, the resulting deficient gradients they provide may fatally compromise the quality of the global ML model. This class of problems are commonly referred to as a Byzantine failure. Byzantine failures can occur unintentionally, or be executed in the form of an attack (Byzantine attack) wherein malicious workers intentionally try to corrupt a FL system by providing strategically dishonest gradients. This powerful attack can be accomplished by a single worker and can adversely affect indefinite numbers of ML models. As a result, it may often be desirable to utilize Byzantine-robust methods, meaning the aggregator can mitigate the adverse effects of dishonest gradients in Byzantine attacks.

Previous Byzantine-robust methods required bounds on the variance of honest gradients that did not often exist in practice and could still be exploited by various attack strategies, such as the Fall of Empires attack. The honest gradient variance may also be especially unpredictable in probable FL settings where local worker data distributions are not independent and identically distributed (IID). Previous algorithms also result in information loss from only using one or a few gradient vectors and rejecting all others (which may be honest). This leads to poor performance in non-attack settings. Additionally, some previous algorithms have computational complexity that is quadratic in terms of the number of workers, making them significantly slower than an averaging baseline, which is linear in the number of workers.

SUMMARY

According to embodiments of the present disclosure, a federated learning method by a federated learning aggregator. One embodiment of the method may comprise creating a log of previously provided gradients from a plurality of workers, receiving updated gradients from the plurality of workers, calculating a vulnerability weight for each layer of a global machine learning model using the updated gradients, calculating an aggregated gradient using the vulnerability weight and the updated gradients, and updating the global machine learning model using the aggregated gradient. Some embodiments may also determine whether a Byzantine attack is occurring based upon the calculated aggregated gradient.

According to embodiments of the present disclosure, a computer program product for a federated learning aggregator. One embodiment may comprise a computer readable storage medium having program instructions embodied therewith. The program instructions may be executable by a processor to cause the processor to create a log of previously provided gradients from a plurality of workers, issue queries to the plurality of workers, receive updated gradients from the plurality of workers, maintain the log within a predetermined maximum log size of past collected gradients from the plurality of workers, calculate a vulnerability weight for each layer of a global machine learning model using the updated gradients, calculate an aggregated gradient using the vulnerability weight and the updated gradients, and periodically update the layer weights in the global machine learning model with a gradient descent step using the aggregated gradient. In some embodiments, the queries may include current parameters for the machine learning model. In some embodiments, the federated learning aggregator may add current gradients to log and remove oldest gradients to keep a current log size less than the predetermined maximum log size.

According to embodiments of the present disclosure, a federated learning aggregator. One embodiment may comprise a processor configured to execute instructions that, when executed on the processor, cause the processor to create a log of previously provided gradients from a plurality of workers, receive updated gradients from the plurality of workers, calculate a vulnerability weight for each layer of a global machine learning model using the updated gradients, calculate an aggregated gradient using the vulnerability weight and the updated gradients, and update the global machine learning model using the aggregated gradient. Some embodiments may further comprise instructions to determine whether a Byzantine attack is occurring based upon the calculated aggregated gradient.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
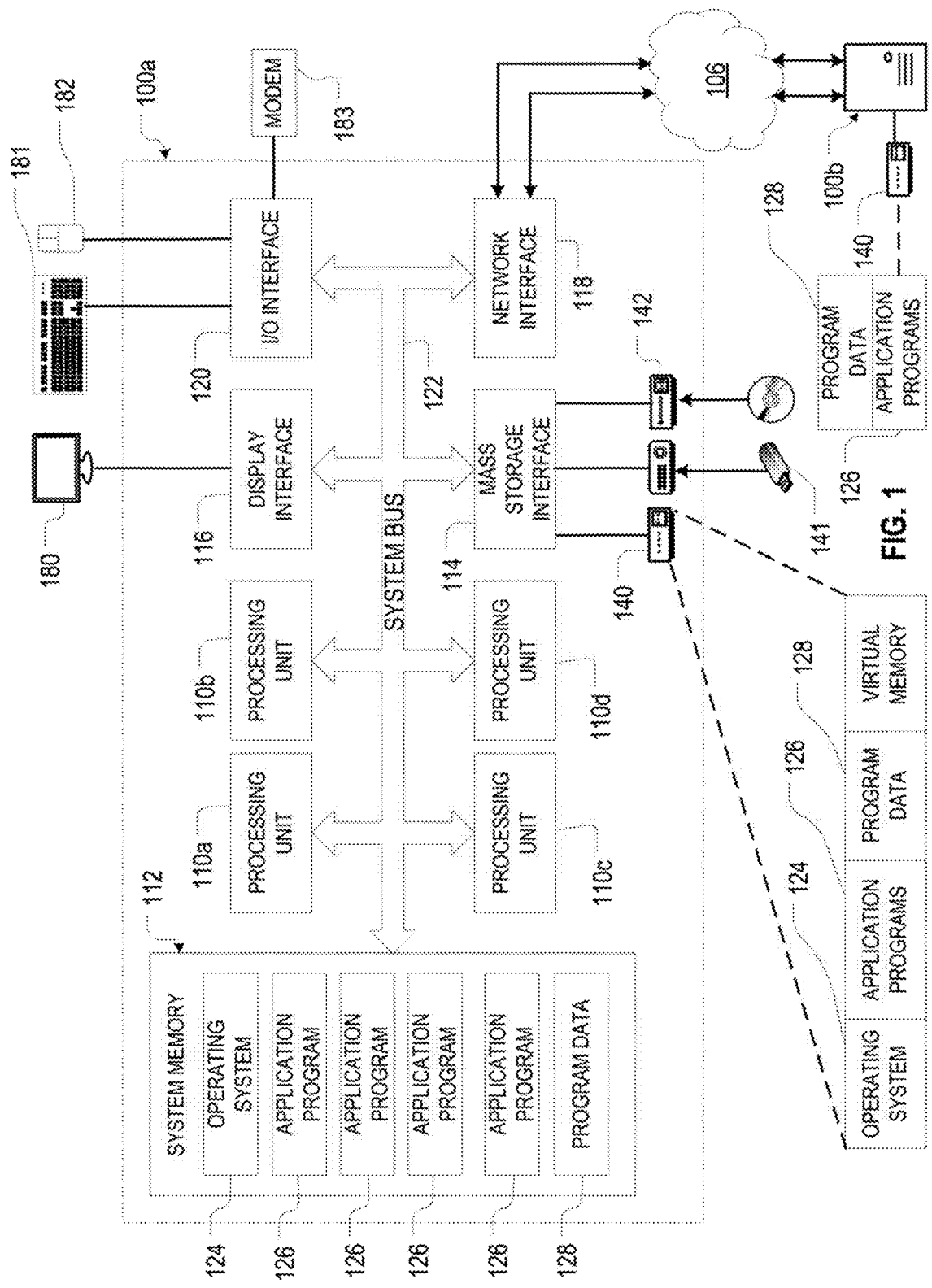
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine learning; more particular aspects relate to Byzantine-robust federated learning. While the present disclosure is not necessarily limited to such applications, various aspects of the disclosure may be appreciated through a discussion of various examples using this context.

Some embodiments of this disclosure include a method to create robust ML models using FL under non-IID and byzantine failures/attack cases. These embodiments may include individual gradient re-weighting of each layer in the global ML model, and dynamically determining the re-weighting factors based at least in part on a normalized robustness score. These features may be desirable to dampen gradient variance and to improve robustness against Byzantine attacks.

Some embodiments may use a Byzantine-robust Federated Learning using a LayerwisE Gradient AggregaTiOn (LEGATO) system. In LEGATO system embodiments, for each logged round (e.g., ten total) at each layer, a Euclidean norm (also known as an L2 norm) across all parties may be computed as $SQRT(a_1^2+a_2^2+ \ldots +a_n^2)$. Then, for each layer, a standard deviation across the L2 norms found above (e.g., one per logged round) may be computed. Next, a robustness factor comprising a reciprocal of the standard deviation from each layer may be computed and normalized to a predetermined range. The robustness may be used to weight the local gradients from the workers. Then, for each worker and at each layer, an average of the weighted gradients across all logged rounds may be computed for each layer. The weighted averages may be used to compute a global average of the weighted gradients across all workers.

In this way, embodiments using the LEGATO system may provide layer-specific gradient re-weighing, which may consider the variance in L2 norms of individual layers. This, in turn, may allow some embodiments to provide improved robustness against adaptive adversaries and may allow for dampening out less robust gradients by using the past gradients.

Embodiments using the LEGATO system may also provide more variance in biases than weights. This feature may be desirable because bias may be analogized to vertical oscillation, and weights to horizontal movement. Additionally, LEGATO systems may be desirable because they allow for more variance in earlier layers. Thus, backpropagation can more aggressively modify the early layers.

Embodiments using the LEGATO system, with its layer-specific consideration of gradients, have been shown to exhibit a linear computational complexity in terms of the number of workers than other robust systems, such as the Krum algorithm. The computational complexity of LEGATO systems may even be comparable to conventional, non-robust algorithms. This reduced computational complexity may be useful in FL deployments in which large scale participation desired. Moreover, embodiments using the LEGATO systems have been shown to be more robust against attacks than other robust algorithms such as Krum and coordinate median, etc. against a variety of attacks settings, including the use of both IID and non-IID local data distributions and different model architectures.

Other features and advantages of some embodiments further include improvements in ML convergence, particularly in settings without attack because these embodiments may allow a FL aggregator to use most, or even all, honest gradients, which in turn, may limit loss of honest information. Additionally, some embodiments may be generalizable against a wide variety of attacks because they do not require assumptions of bounded honest gradient nor require thresholds on number of Byzantine workers to tolerate. The robustness based weighting of some LEGATO embodiments may further improve Stochastic Gradient Descent (SGD) convergence, such as e.g., for overparameterized neural networks, even in the absence of a Byzantine attack, because they may reduce gradient variance reduction and noise.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110*a*-110*d* (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100*a* to communicate with other DPS 100*b* over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100*a*, some or all of them may be physically located on a different computer system (e.g., DPS 100*b*) and may be accessed remotely, e.g., via the network 106, in some embodiments. Moreover, the operating system 124, the application programs 126, and the program data 128 are not necessarily all completely contained in the same physical DPS 100*a* at the same time, and may even reside in the physical or virtual memory of other DPS 100*b*.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
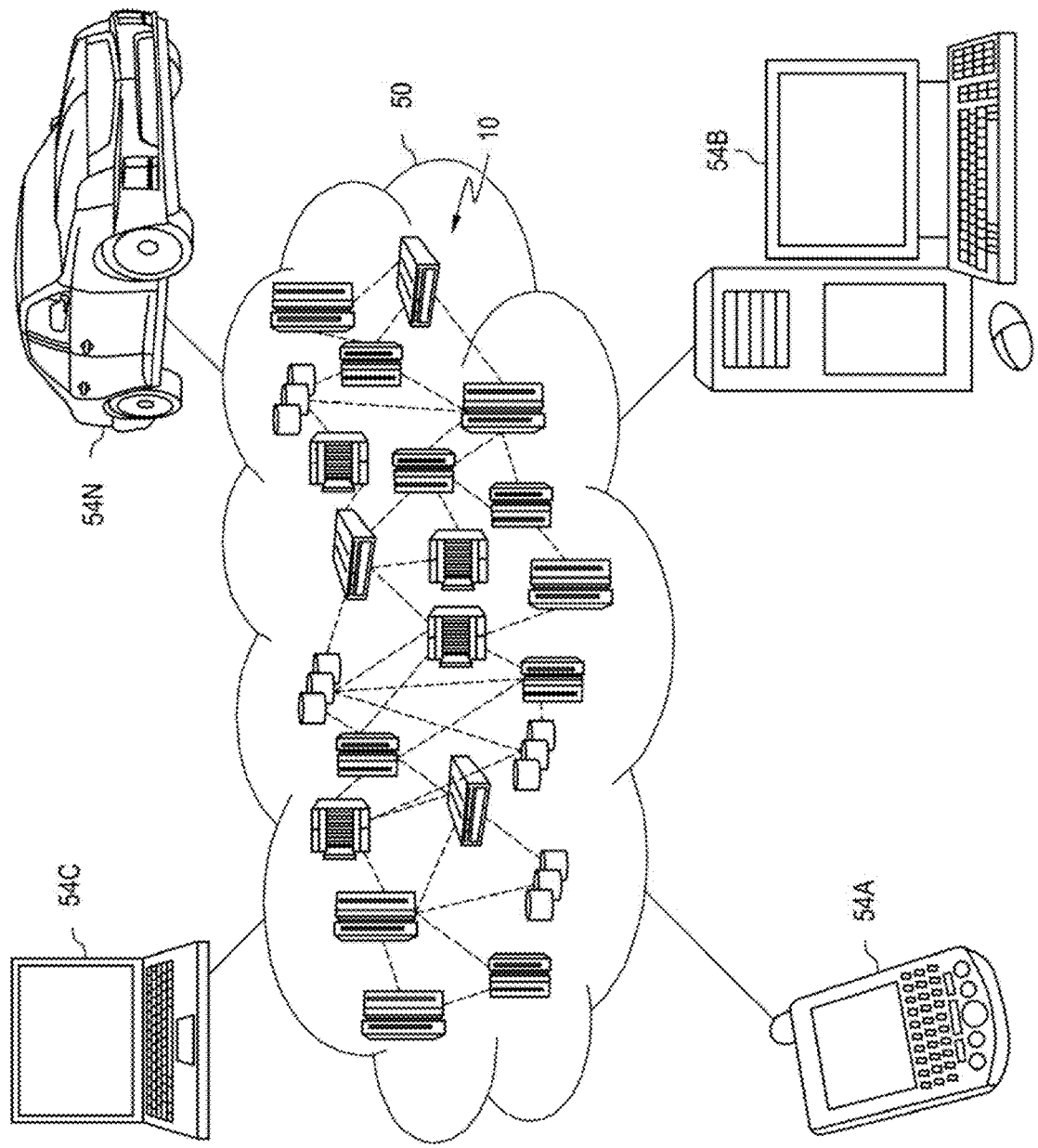
FIG. 2 depicts a cloud computing environment, consistent with some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:
Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
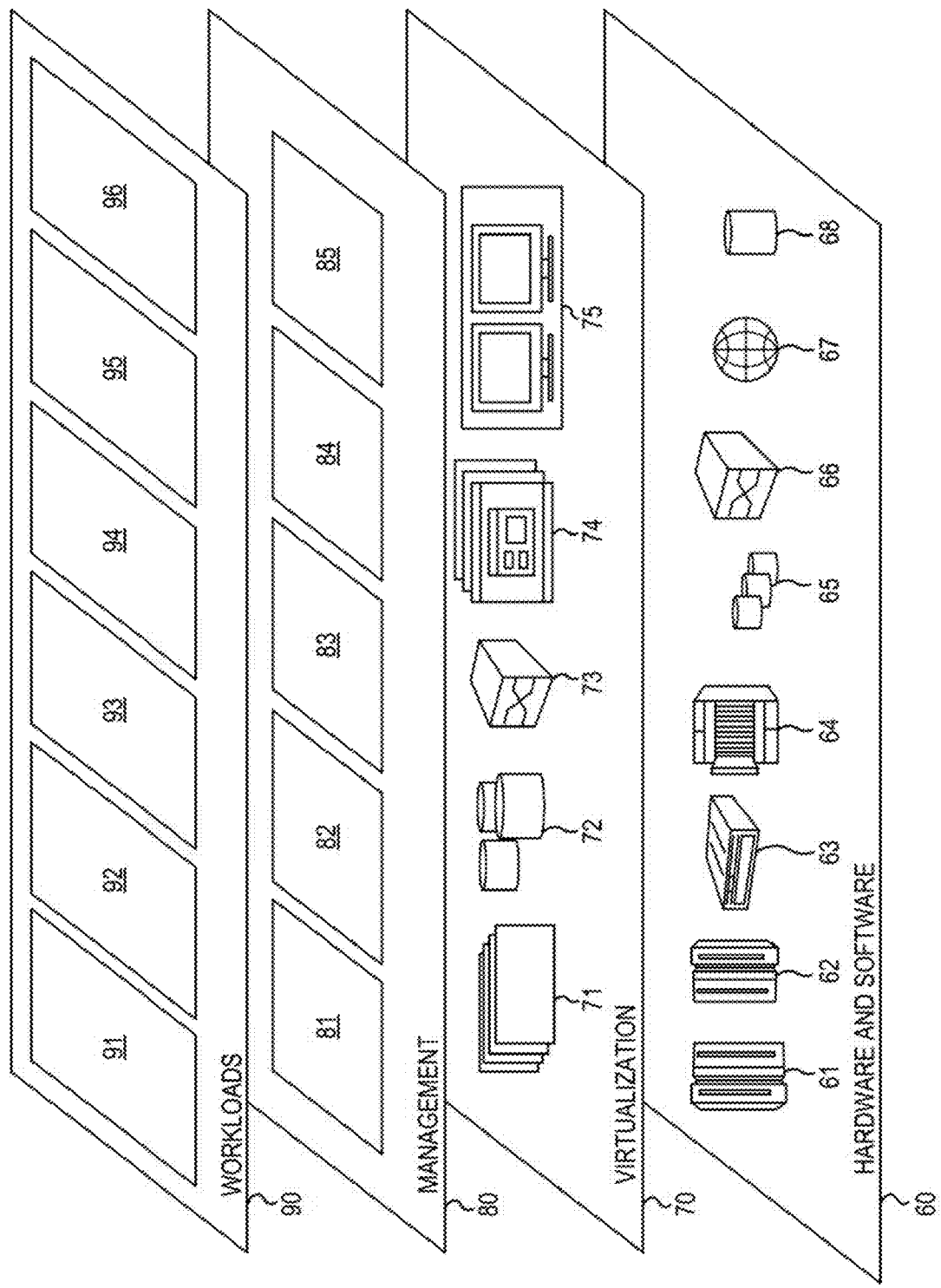
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning module 96.

Machine Learning

The machine learning models ("ML models" or MLMs) in some embodiments may be any software system that recognizes patterns. In some embodiments, the ML models comprise a plurality of artificial neurons interconnected through connection points called synapses or gates. Each synapse encodes a strength of the connection between the output of one neuron and the input of another. The output of each neuron, in turn, is determined by the aggregate input received from other neurons that are connected to it, and thus by the outputs of these "upstream" connected neurons and the strength of the connections as determined by the synaptic weights.

Figure 4A:
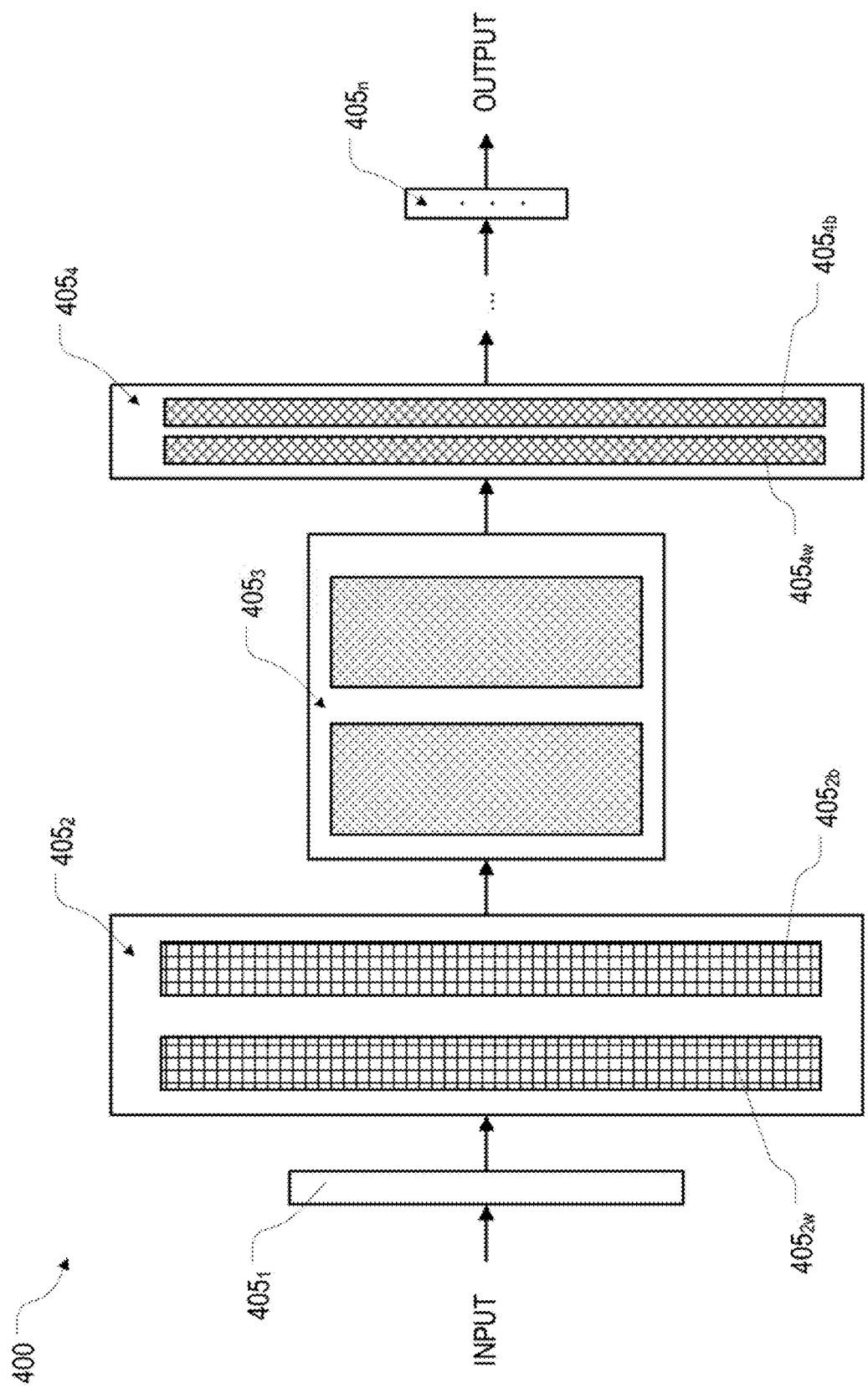
FIG. 4A illustrates an example ML model, consistent with some embodiments.

The ML models are trained to solve a specific problem (e.g., speech recognition) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. FIG. 4A illustrates an example ML model 400, consistent with some embodiments. The ML model 400 comprises a plurality of layers $405_1$-$405_n$. Each of the layers comprises weights $405_{1w}$-$405_{nw}$ and biases $405_{1b}$-$405_{nb}$ (only some labeled for clarity). The layer $405_1$ that receives external data is the input layer. The layer $405_n$ that produces the ultimate result is the output layer. Some embodiments include a plurality of hidden layers $405_2$-$405_{n-1}$ between the input and output layers, and commonly hundreds of such hidden layers. Some of the hidden layers $405_2$-$405_{n-1}$ may have different sizes, organizations, and purposes than other hidden layers $405_2$-$405_{n-1}$. For example, some of the hidden layers in the ML model may be convolution layers, while other hidden layers may be fully connected layers, deconvolution layers, or recurrent layers.

Figure 4B:
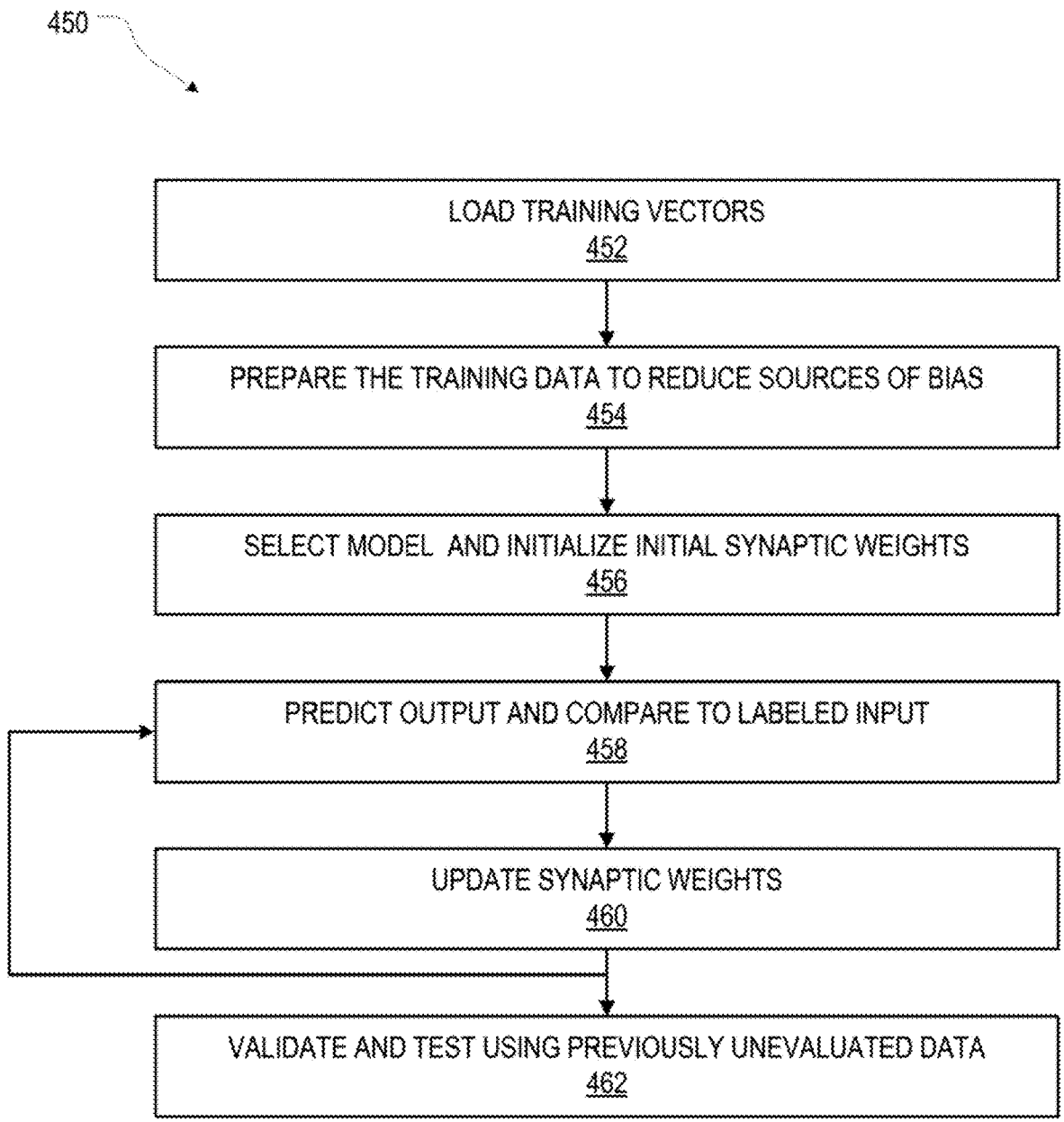
FIG. 4B is a flow chart illustrating one embodiment of a ML model training method, consistent with some embodiments and described with reference to speech recognition as an illustrative example.

Referring now to FIG. 4B, one embodiment of a ML model training method 450 is depicted, described with reference to speech recognition as an illustrative example. At operation 452, the system receives and loads training data. In this example, the input data-set may include recorded television audio and the target data-set may include manually transcribed close caption data. At operation 454, the training data is prepared to reduce sources of bias, typically including de-duplication, normalization, and order randomization. At operation 456, a model is selected for training and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At operation 458, the selected model is used to predict an output using the input data element, and that prediction is compared to the corresponding target data. A gradient (e.g., difference between the predicted value and the target value) is then used at operation 460 to update the synaptic weights. This process repeats, with each iteration updating the weights, until the training data is exhausted, or the model reaches an acceptable level of accuracy and/or precision. At operation 462, the resulting model may optionally be compared to previously unevaluated data to validate and test its performance.

Federated Learning

Figure 5:
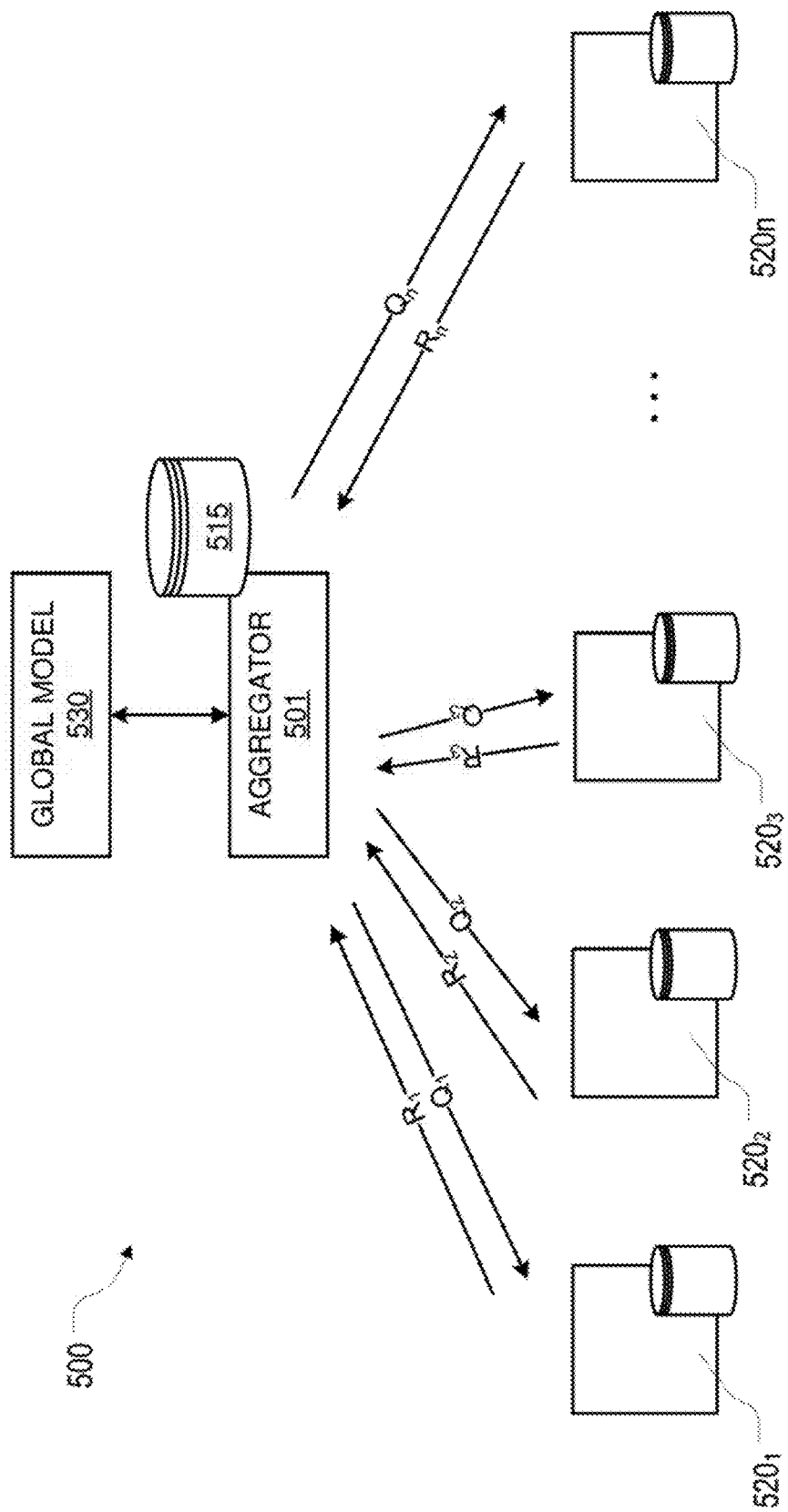
FIG. 5 is a high level relational diagram of a FL system, consistent with some embodiments.

FIG. 5 is a high level relational diagram of a FL system 500, consistent with some embodiments. This FL system 500 may comprise an FL aggregator 501 executing in a machine learning module 96 on a DPS 100 in a cloud computing environment 50 (see FIGS. 1-3) and a plurality of workers $520_1$-$520_n$. The aggregator 501 in this embodiment may monitor the FL process, issue a series of "m" rounds of queries $Q_{1,1}$-$Q_{n,m}$ to each of the workers $520_a$-$520_n$, and collect responses $R_{1,1}$-$R_{n,m}$ from the workers $520_1$-$520_n$ (collectively workers 520, queries Q, and responses R) The aggregator 501 may use collected responses R to update a global ML model 530 and may store the collected responses R in a log 515.

In operation, each of the individual queries Q sent to each of the worker 520 in each round may include the current parameters (e.g., weight(s)) of a global ML model 530 and may request the worker 520 calculate gradients Q(D) using their respective local databases $D_1$-$D_n$. Alternatively, each of the queries Q may include the current global ML model parameter(s) and request new local ML model parameters from the workers 520. Additionally, some or all of the queries Q may ask for information about a specific label (class), such as counts, etc.

In response to the queries Q, each worker 520 may generate a series of "m" responses $R_{1,1}$-$R_{n,m}$ (one for each round) and transmit those responses R back to the aggregator 501. The aggregator 501 may use those responses R to update the global ML model 530. This process may repeat for a number of rounds, for example, until the global model 530 achieves a predetermined accuracy or a predetermined number of rounds has been completed.

Federated Model Training

Figure 6A:
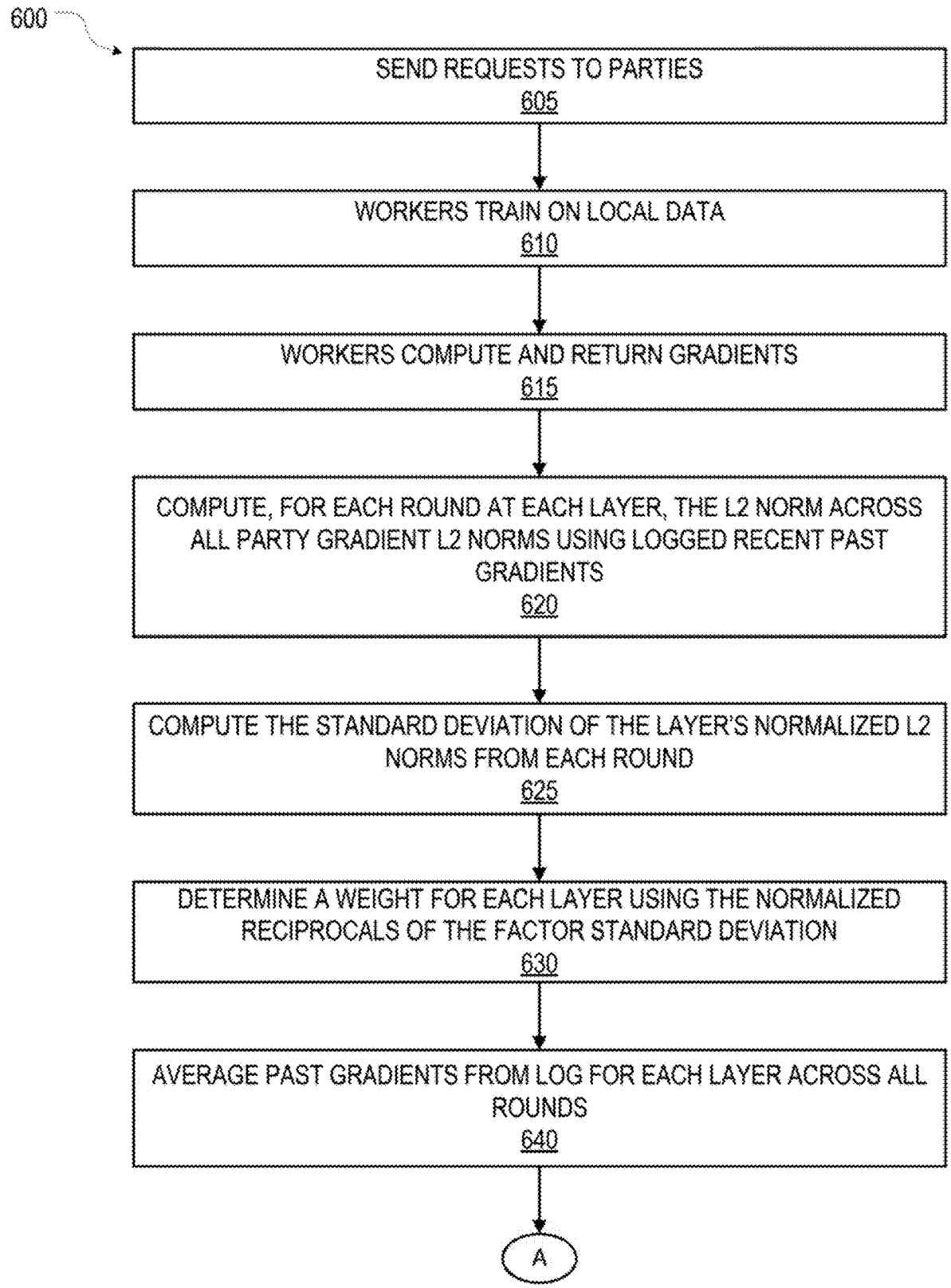
FIGS. 6A-6B (collectively FIG. 6) are a flow chart showing one embodiment of the aggregator in operation, consistent with some embodiments.
Figure 6B:
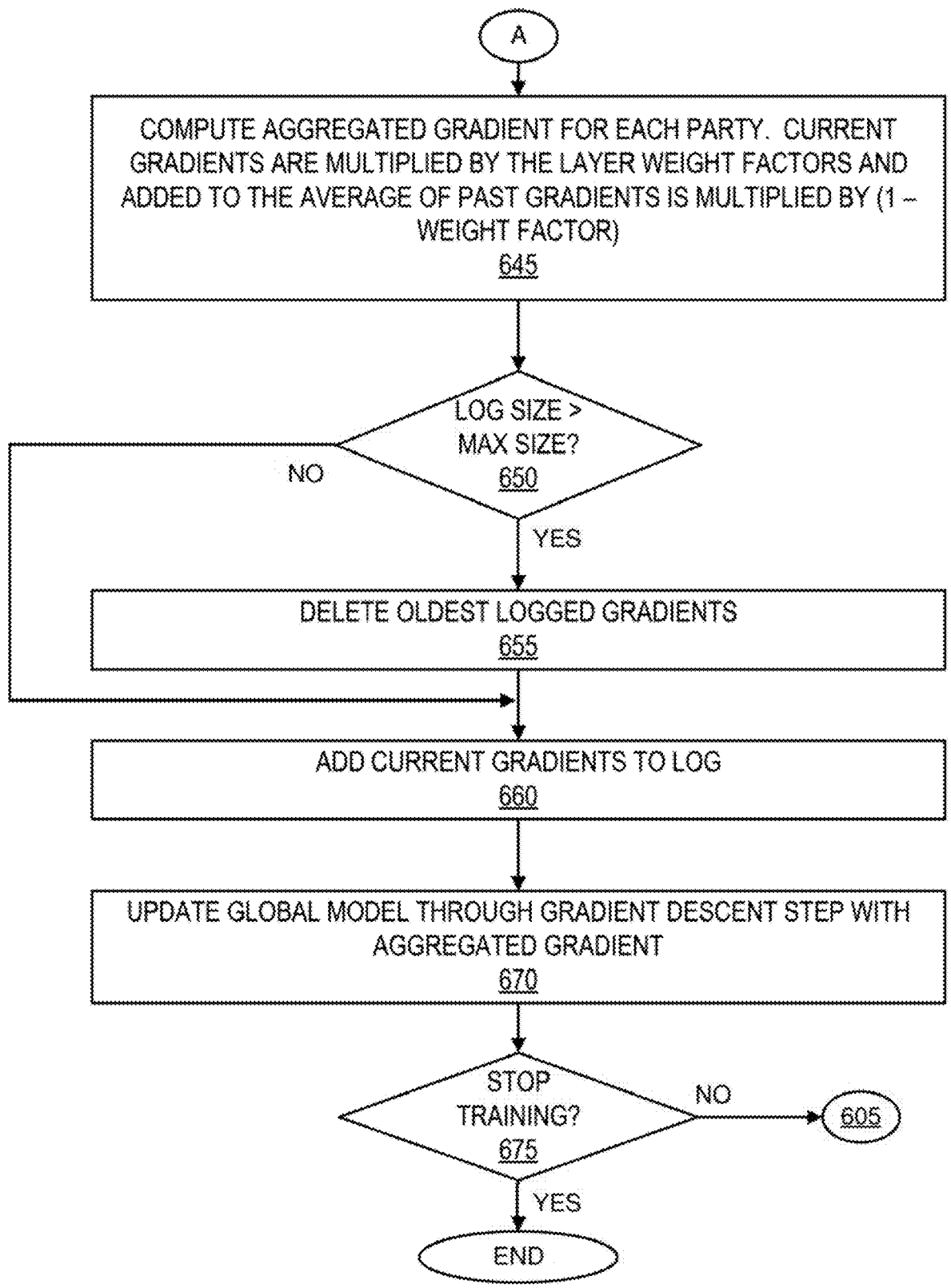

FIGS. 6A-6B (collectively FIG. 6) are parts of a flow chart showing one embodiment of the aggregator 501 in operation, consistent with some embodiments. At operation 605, the aggregator 501 may begin transmitting a round of queries Q to the workers 520. These queries may include the current parameters for the global ML model 430. These queries Q may also include a request to train the current version of the global ML model 530 against that worker's local data $D_1$-$D_n$. In response, the workers 520 may train the current version of the global ML model 530 on their respective local data $D_1$-$D_n$ for small number of epochs at operation 610. The workers 520 may then compute gradients for their local (i.e., further trained) version of the global ML model 530 and then may send the computed gradients to the aggregator 501 at operation 615.

For each of the "m" rounds of training, the aggregator 501 may receive a plurality of gradients from each of the plurality of the workers 520. In synchronous embodiments, the aggregator 501 may wait until it has received responses R from all of the queried workers 520, but non-synchronous embodiments are also consistent with this disclosure. The aggregator 501 may store the responses R in its log 515. The log 515 may have a predetermined maximum size, and the aggregator 501 may prioritize the most recently received gradients from each worker 520.

At operations 620-630, the aggregator 501 may calculate and assign a robustness factors to each of the layers in the global ML model 530. This may include computing, by the aggregator 501 for each round at each layer, the L2 norm across all worker gradient L2 norms using the logged recent past gradients (round 1 initialized to all zeros) at operation 620. The aggregator 501 may then compute, for each layer in the global ML model 530, the standard deviation of that layer's normalized L2 norms for each round at operation 625. Next, the aggregator 501 may calculate a weight factor for each layer using the normalized reciprocals of the standard deviation at operation 630, such as e.g., using the normalized reciprocals of the standard deviation per layer as the weight factor for each layer Next, the aggregator 501 may average past gradients (e.g., stored in the log 515) for each layer in the global ML model 530 across all rounds stored in the log 515 at operation 640. The aggregator 501 may use the calculated average past gradients value to compute aggregated gradient for each worker 520 at operation 645. In some embodiments, current gradients may be multiplied by the layer weight factors (calculated at operation 630) and then added to the average of past gradients is multiplied by (1—weight factor).

At operation 650, the aggregator 501 may determine whether or not a size of the log 515 has passed a threshold maximum size. If not (650=no), then the aggregator 501 may add the current gradients to log 515 at operation 660. If the log size is larger than the threshold (650=yes), then the aggregator may delete the oldest logged gradients at operation 655 before adding the current gradients to log 515 at operation 660.

The aggregator 501 may then update the global ML model 530 through gradient descent step with the calculated aggregated gradient at operation 670. The aggregator 501 may then determine if training is complete (e.g., because a predetermined accuracy threshold has been met, because a predetermined number of training rounds have already been performed, etc.) If training is to continue (i.e., 675=yes), then flow may return to operation 605, otherwise the flow 600 may end.

Appendices A and B contain pseudo-code for an illustrative example of flows 500 and 600. In this illustrative example, the aggregator 501 may update the gradient log, GLog, to contain the most recent m gradients collected from workers after all of the responses are received. The aggregator 501 may then use GLog to compute the layer-specific normalized L2 norms: $P_L{}^i$in using e.g., the equation in line 12 of Appendix B below. The aggregator 501 may then use the reciprocal of the standard deviation of these norms across all logged rounds as a robustness factor that is assigned to each layer and normalized across all layers (Appendix B, lines 15-17). The less the L2 norms vary across rounds, the more robust a layer may be.

Each worker's gradients may be reconfigured as a weighted sum of the average of the individual worker's $520_1$-$520_n$ logged gradients and its current gradient vector using e.g., the equation in line 20 of Appendix B. These weights may be chosen as a function of the robustness factor per layer, which allows the updates of less robust layers to rely more heavily on the average of past gradients. Finally, these reweighed gradients may be averaged across all workers and the result is used as round t's aggregated gradient, $G_{agg}{}^t$, using e.g., the equation at line 23 of Appendix B. This reweighing technique may dampen the noise across gradients that may be a result of a Byzantine attack, with the beneficial effect of reversing the Byzantine gradients' effect of pulling the aggregated gradient away from an honest value.

One feature and advantage of the embodiment in Appendix B is that it may focus the dampening effect at the most vulnerable layers allows reliable layers' current gradients, which are most accurate, to still weigh heavily into the aggregated gradient, thus limiting the sacrifice of convergence speed that could result from using past gradients. Additionally, the online robustness factor computation allows this embodiment of the LEGATO system to generalize to a variety of model architectures because it may adopt online factor assignments rather than an absolute quantification of robustness. In many applications, this knowledge of layer specific robustness varies between architectures, so an online and model-agnostic approach may provide significant advantages.

Aggregated Gradient Computation

Figure 7:
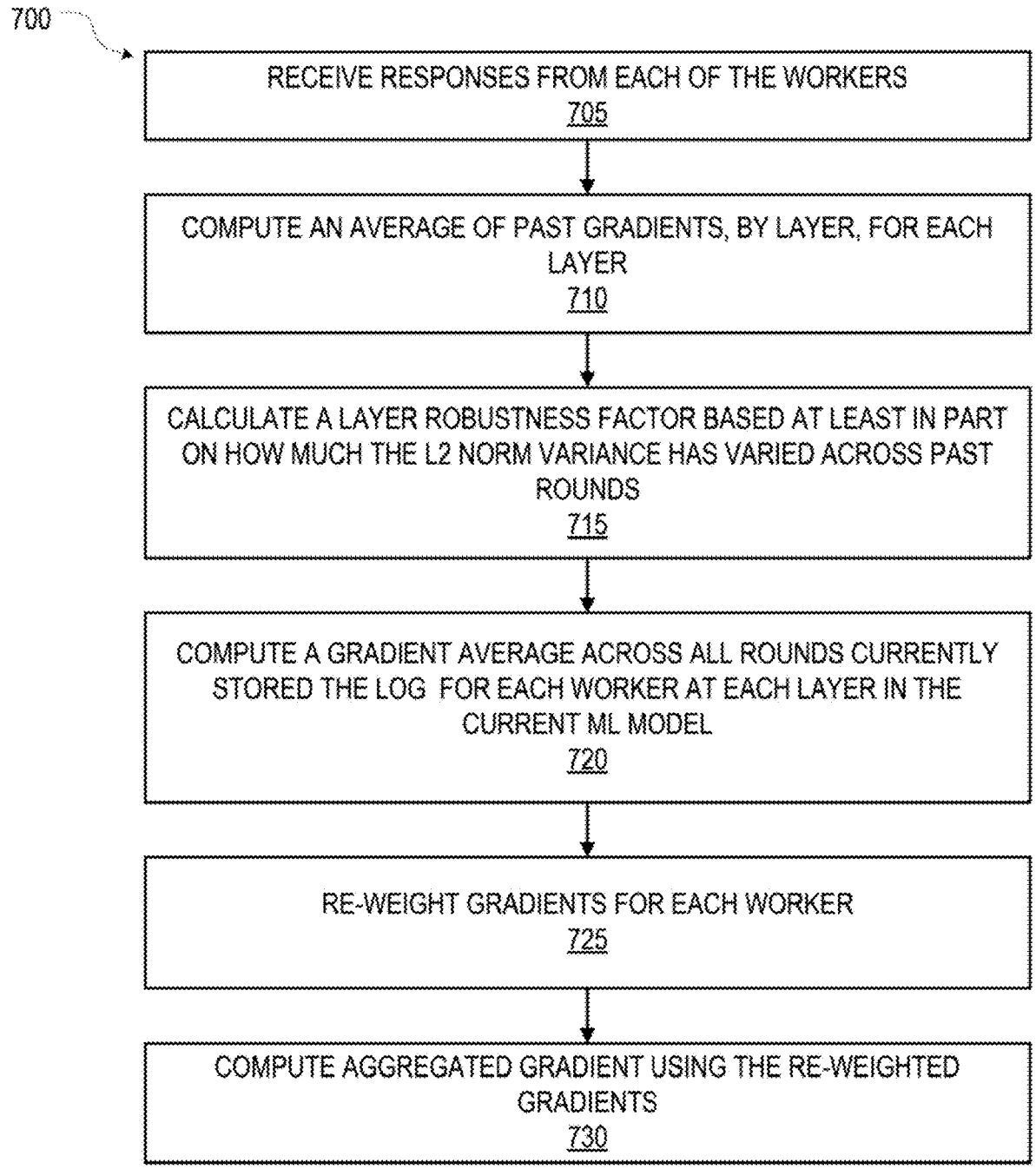
FIG. 7 is a flow chart illustrating one method of calculating the aggregated gradients in more detail, consistent with some embodiments.

FIG. 7 is a flow chart illustrating one method 700 of calculating the aggregated gradients in more detail, consistent with some embodiments. At operation 705, the aggregator 501 may receive responses to its queries from each of the workers 520. These responses may include the current gradients calculated by the workers 520 using their local data sources D. At operation 710, the aggregator 501 may compute an average of past gradients, by layer, for each layer in the ML model using its log 515 of gradients from recent past rounds.

Next, the aggregator 501 may calculate a layer robustness factor based at least in part on how much the L2 norm variance has varied across past rounds at operation 715, and normalize the calculated robustness factors against a predetermined range (e.g., between zero and one). In one embodiment, this may include, for each layer and for each round, computing a standard deviation across values computed from all previously logged rounds using: (i) the normalized L2 norm for layer for the logged rounds; and (ii) and the current round's gradients for each worker 520. Next, the resulting raw calculated values are normalized to a predetermined range (e.g., to between zero and one).

At operation 720, the aggregator 501 may compute a gradient average across all rounds currently stored the log 515 (e.g., ten rounds) for each worker 520 at each layer in the current ML model. Next, at operation 725, the aggregator may re-weight gradients for each worker 520 (e.g., current gradients for each worker 520 at a particular layer in the ML model). The aggregator may then compute an aggregated gradient using the re-weighted gradients at operation 730.

Figure 8:
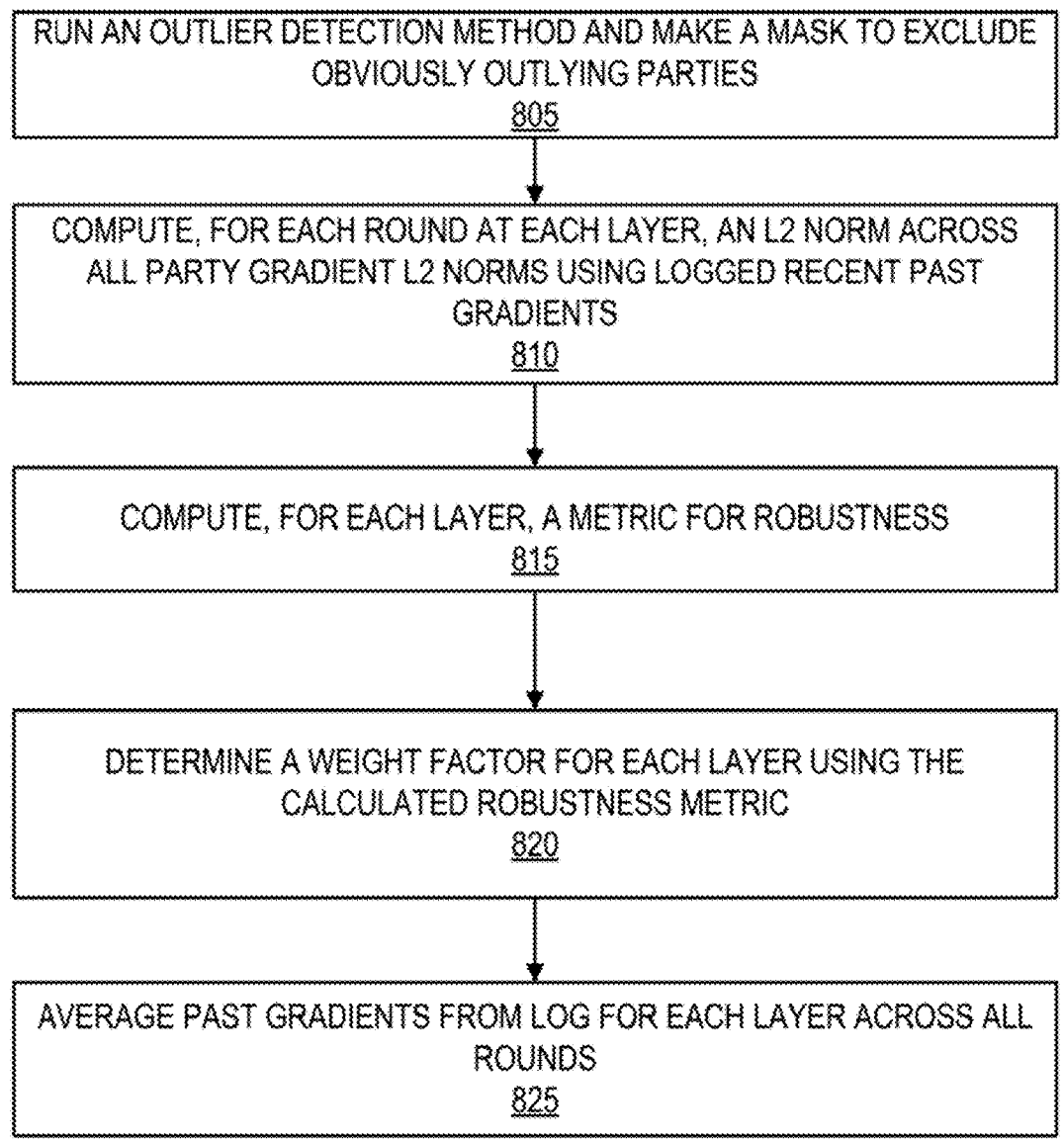
FIG. 8 is a flow chart illustrating an alternate method of calculating the aggregated gradients in more detail, consistent with some embodiments.

FIG. 8 is a flow chart illustrating an alternate method 800 of calculating the aggregated gradients in more detail, consistent with some embodiments. At operation 805, the aggregator 501 may run an outlier detection method and then make a mask to be used in future rounds to exclude obviously outlying parties using e.g., Krum, to exclude a party or a subset of parties with the highest score, which may indicate this party or subset of parties are far away from others. Operation 805 may be executed periodically, or may be executed once early on in the training process.

Next, at operations 810-820, the aggregator 501 may calculate and assign layer robustness factors. The calculated factors may be recomputed periodically in some embodiments, and thus, each steps may not always be executed at each round. Operation 810 may begin with the aggregator computing for each round at each layer, an L2 norm across all party gradient L2 norms using logged recent past gradients. In some embodiments, the first round may be initialized based on prior knowledge in operation 810. Next, at operation 815, the aggregator 501 may compute, for each layer, a metric for robustness. Suitable metrics include, without limitation, the reciprocal standard deviation. Aggregator 501 may then determine a weight factor for each layer using the calculated robustness metric at operation 820.

Flow 800 may end at operation 825 with the aggregator 501 averaging past gradients from log for each layer across all rounds.

ILLUSTRATIVE EXAMPLE

This illustrative example trains a simple convolutional neural network (CNN), whose trainable layer weights and biases are listed in Table 1 below, in a FL system with ten workers.

TABLE 1

| Order | Layer | Parameters | Dimension |
|---|---|---|---|
| 1 | conv 1 | weights | 288 |
|   |        | biases  | 32 |
| 2 | conv 2 | weights | 18432 |
|   |        | biases  | 64 |
| 3 | dense 1 | weights | 1179648 |
|   |        | biases  | 128 |
| 4 | dense 2 | weights | 1280 |
|   |        | biases  | 10 |

Each worker in this illustrative example has one thousand data points randomly drawn from the MNIST data-set (available from the National Institute of Standards and Technology), so their local distributions can be safely presumed IID. The local gradients can therefore be expected to be relatively similar. By using L2 norms to measure the difference among them, we confirm this expectation and further study the similarity at a layer level and with the inclusion of Byzantine gradients.

Figure 9A:
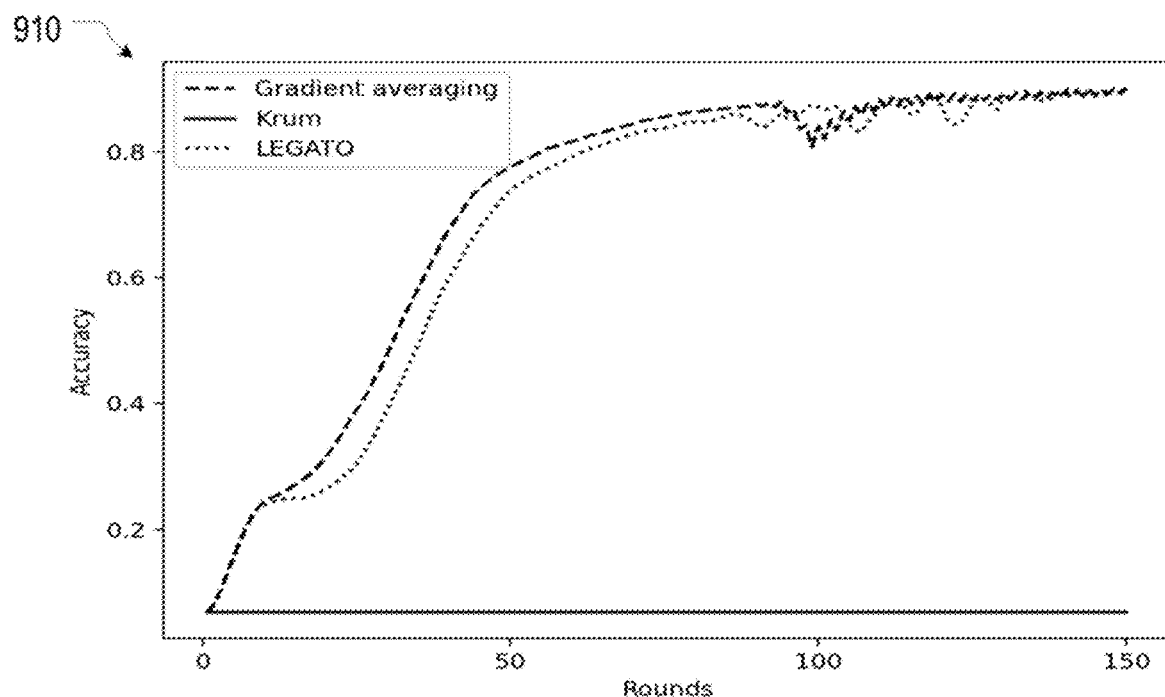
FIG. 9A is a graph showing the performance a LEGATO embodiment in comparison with gradient averaging and the Krum method under a Fall of Empires attack.

FIG. 9A is a graph 910 showing the performance a LEGATO embodiment in comparison with gradient averaging and the Krum method under a Fall of Empires attack, where eleven out of twenty-five workers execute the attack with $\varepsilon$=0.001. As it can be seen in FIG. 9A, the Fall of Empires attack is effective against Krum, but not against LEGATO or gradient averaging.

Figure 9B:
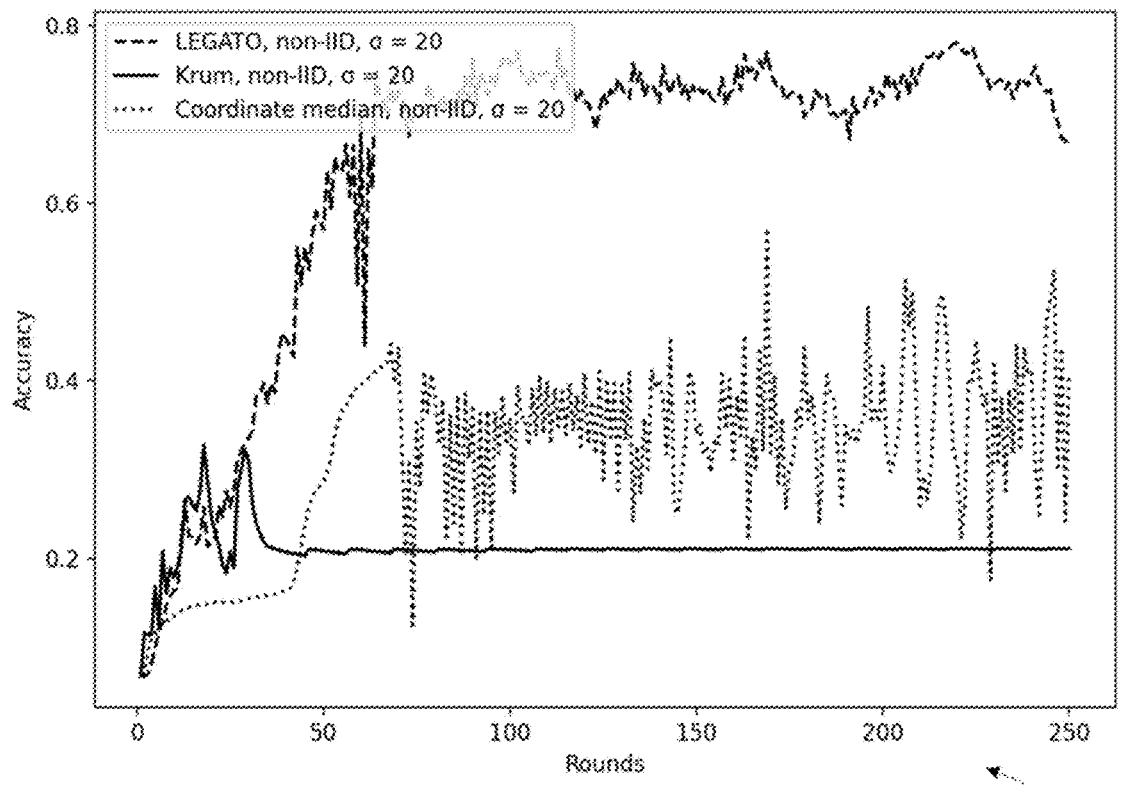
FIG. 9B is a graph comparing accuracy of a LEGATO embodiment under Gaussian attack.

FIG. 9B is a graph 920 comparing accuracy of a LEGATO embodiment under Gaussian attack, where four out of the twenty-five workers are Byzantine and randomly sample gradients from $N(0; \sigma^2 I)$. For all cases, the parties in the examples have non-IID data distribution, the batch size is 50, and the learning rate is 0.03. FIG. 9B shows that Krum and coordinate median performs poorly when a Gaussian attack is presented. In particular, when the Gaussian attack uses a small variance, e.g., $\sigma$=20, some LEGATO embodiments may achieve a significant improvement in model accuracy compared to Krum and coordinate median.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A federated learning method by a federated learning aggregator, comprising:
   creating a log of previously provided gradients from a plurality of workers;
   issuing queries to the plurality of workers, wherein the queries include current parameters for a global machine learning model;
   receiving updated gradients from the plurality of workers;
   maintaining the log within a predetermined maximum log size of past collected gradients from the plurality of workers, wherein the federated learning aggregator adds current gradients to the log and removes oldest gradients from the log to keep a current log size of the log less than the predetermined maximum log size;
   calculating a vulnerability weight for each layer of the global machine learning model using the updated gradients;
   calculating an average of the previously provided gradients;
   multiplying the average of the previously provided gradients by one minus the layer's vulnerability weight to generate a weighted average;
   multiplying the updated gradients by each layer's vulnerability weight to generate re-weighted gradients;
   adding the re-weighted gradients to the weighted average to calculate an aggregated gradient; and
   updating the global machine learning model using the aggregated gradient.

2. The method of claim 1, further comprising determining whether a Byzantine attack is occurring based upon the calculated aggregated gradient.

3. The method of claim 1, further comprising periodically updating the vulnerability weight for each layer of the global machine learning model.

4. The method of claim 1, further comprising calculating a robustness factor for a plurality of layers in the global machine learning model, wherein calculating the robustness factor comprises:
   calculating, for each layer in the global machine learning model, an L2 norm across the previously provided gradients and the updated gradients;
   calculating, for each layer in the global machine learning model, a standard deviation of each layer's L2 norms from each round; and
   determining the weight factor for each layer using the normalized reciprocals of the calculated standard deviations.

5. The method of claim 1, wherein the global machine learning model is updated with a gradient descent step using the aggregated gradient.

6. The method of claim 1, further comprising identifying a layer in the global machine learning model that is relatively more vulnerable to Byzantine attacks.

7. The method of claim 1, further comprising filtering outlier gradients.

8. A computer program product for a federated learning aggregator, the computer program product comprising:
   a computer readable storage medium having program instructions embodied therewith, the program instructions executable by a processor to cause the processor to:
   create a log of previously provided gradients from workers;
   issuing queries to the workers, wherein the queries include current parameters for a global machine learning model;
   receive updated gradients from the workers;
   maintaining the log within a predetermined maximum log size of past collected gradients from the plurality of workers, wherein the federated learning aggregator adds current gradients to the log and removes oldest gradients from the log to keep a current log size of the log less than the predetermined maximum log size;
   calculate a vulnerability weight for each layer of the global machine learning model using the updated gradients;
   reconfigure respective gradients from the workers individually based on the vulnerability weights;
   calculate an aggregated gradient by averaging the reconfigured gradients from the workers; and
   updating the global machine learning model using the aggregated gradient.

9. A federated learning aggregator comprising a processor and a memory coupled with and readable by the processor, wherein the memory stores program instructions which when executed by the processor cause the processor to:
   create a log of previously provided gradients from a plurality of workers;
   issuing queries to the plurality of workers, wherein the queries include current parameters for a global machine learning model;
   receive updated gradients from the plurality of workers;
   compute a respective robustness factor for layers in the global machine learning model by using the updated gradients and the previously provided gradients retrieved from the log, wherein the respective robustness factor is computed via:
   calculating, for each layer in the global machine learning model, an L2 norm across the previously provided gradients and the updated gradients;
   calculating, for each layer in the global machine learning model, a standard deviation of each layer's L2 norms from each round; and
   determining the respective robustness factor for each layer using the normalized reciprocals of the calculated standard deviations;
   calculating a vulnerability weight for each layer of a global machine learning model using the updated gradients;
   calculating an aggregated gradient using the vulnerability weight and the updated gradients; and
   updating the global machine learning model using the aggregated gradient.

10. The federated learning aggregator of claim 9, further comprising instructions to determine whether a Byzantine attack is occurring based upon the calculated aggregated gradient.

11. The federated learning aggregator of claim 9, further comprising instructions to maintain the log within a predetermined maximum log size of past collected gradients from the plurality of workers, wherein:
- the federated learning aggregator adds current gradients to the log; and
- the federated learning aggregator removes oldest gradients from the log to keep a current log size of the log less than the predetermined maximum log size.

12. The federated learning aggregator of claim 9, further comprising instructions to periodically update the vulnerability weight for each layer of the global machine learning model.

13. The federated learning aggregator of claim 9, wherein calculating the robustness factor comprises:
- calculating, for each layer in the global machine learning model, a standard deviation of each layer's L2 norms from each round; and
- determining the weight factor for each layer using a normalized reciprocals of the calculated standard deviations.

* * * * *